United States Patent [19]

Degen et al.

[11] 4,323,362
[45] Apr. 6, 1982

[54] DYED PAPER

[75] Inventors: Hans-Juergen Degen, Lorsch; Klaus Grychtol, Bad Duerkheim, both of Fed. Rep. of Germany

[73] Assignee: BASF Aktiengesellschaft, Ludwigshafen, Fed. Rep. of Germany

[21] Appl. No.: 224,943

[22] Filed: Jan. 14, 1981

Related U.S. Application Data

[62] Division of Ser. No. 109,042, Jan. 2, 1980.

[30] Foreign Application Priority Data

Jan. 18, 1979 [DE] Fed. Rep. of Germany ....... 2901845

[51] Int. Cl.³ .............................................. D21H 1/46
[52] U.S. Cl. ...................................... 8/506; 162/162; 542/417; 542/419; 542/433; 542/434; 542/435; 542/436; 542/442; 542/444; 542/454; 542/455; 542/456; 542/457; 542/458; 542/447

[58] Field of Search ............... 542/454, 455, 456, 417, 542/419, 433, 434, 435, 436, 442, 444, 457, 458; 8/506; 162/162

[56] References Cited

U.S. PATENT DOCUMENTS 2,465,412  3/1949  Wilson ................................ 542/447
4,212,644  7/1980  Degen ................................. 8/506
4,221,562  9/1980  Pociluyko .......................... 8/506
4,256,458  3/1981  Degen et al. ...................... 542/457

Primary Examiner—Arthur P. Demers
Attorney, Agent, or Firm—Oblon, Fisher, Spivak, McClelland & Maier

[57] ABSTRACT

Compounds of the general formula $$A^1=CH-B-CH=A^2$$

where $A^1$ and $A^2$ are the radical of a quaternized methylene-active compound and B is a bridge member.

The compounds according to the invention are very suitable for coloring ligneous and lignin-free paper stock.

2 Claims, No Drawings

DYED PAPER

This is a division of application Ser. No. 109,042, filed Jan. 2, 1980.

The present invention relates to compounds of the general formula I $$A^1=CH-B-CH=A^2 \qquad I$$

where $A^1$ and $A^2$ are the radical of a quaternized methylene-active compound and B is a bridge member.

The radicals of the methylene-active compounds are quaternized heterocyclic radicals wherein the methylene-active group is $CH_3-$ or $>CH_2$. They are in the main derived from the non-fused or fused pyridinium or pyrylium series or from quaternized benzthiazoles, benzimidazoles, indolenines, quinoxalones or pyrimidones.

The following are specific examples of compounds of the formulae $A^1H_2$ and $A^2H_2$:

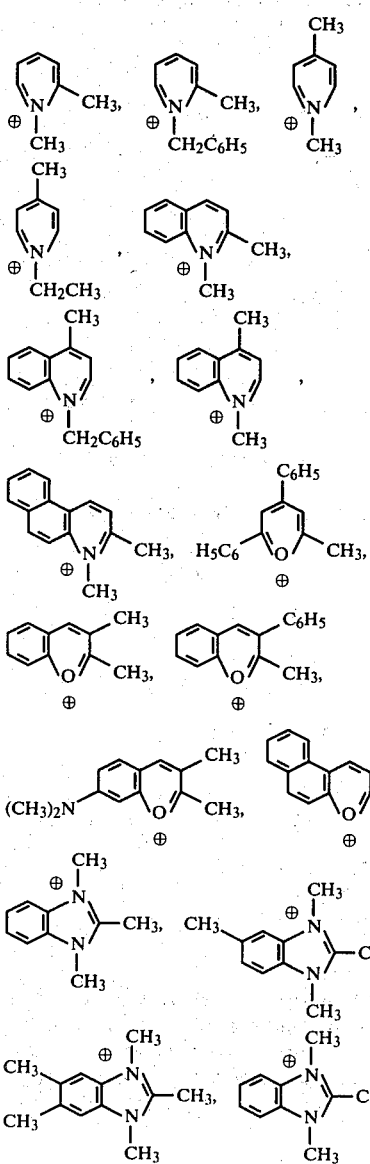

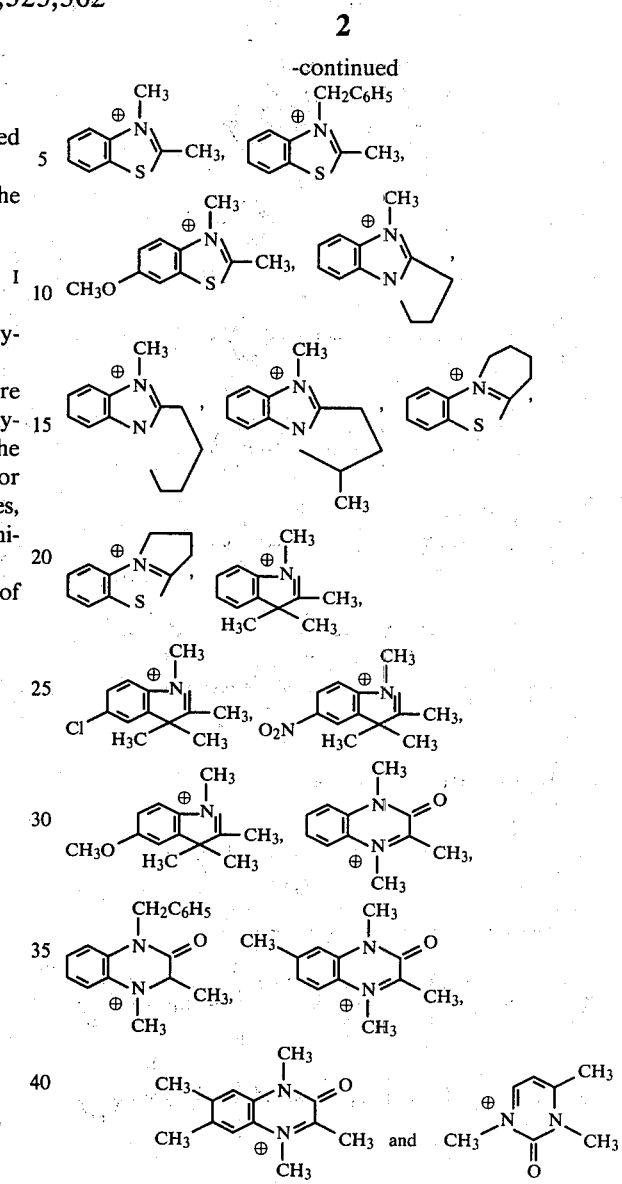

The bridge members B are derived from aromatic or heterocyclic bis-aldehydes, in the main of the benzene series, which may additionally contain conventional substituents, eg. chlorine, methyl, methoxy or ethoxy.

Specific examples of radicals B are:

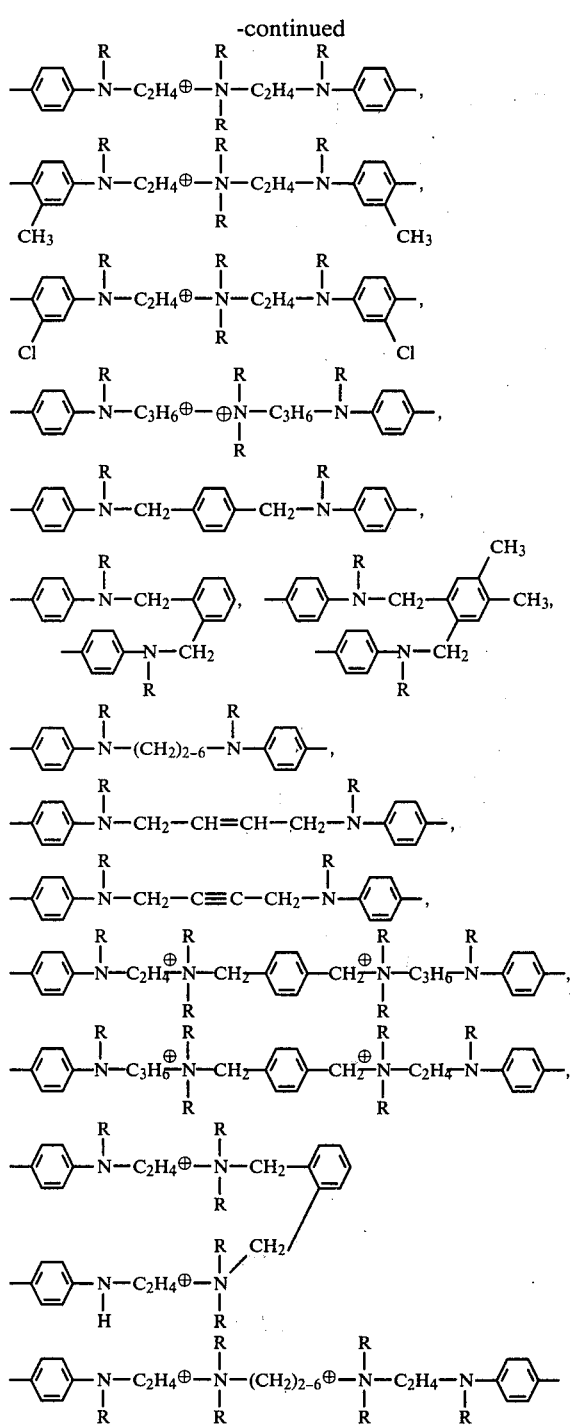

where R is $C_1$-$C_4$-alkyl, β-hydroxyethyl, β-cyanoethyl or benzyl.

A compound of the formula I may be prepared by reacting compounds of the formulae $A^1H_2$ and $A^2H_2$, which may be identical or different, with bis-aldehydes of the formula

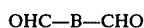

in the conventional manner.

Details of the reactions may be found in the Examples, where parts and percentages are by weight, unless stated otherwise.

The compounds of the formula I are particularly suitable for wet-end coloring of sized and unsized paper and have a high affinity for both ligneous paper stock (ie. stock containing groundwood) and lignin-free stock. The majority of the novel dyes are substantive and the waste water after coloring the paper is almost or completely colorless. The attainable hues range from yellow to blue.

Compounds of the formula I which are of particular importance are those where $A^1$ and/or $A^2$ is derived from the quinolinium, γ-picolinium, indolinium, benzthiazolium and quinoxalonium series and the radicals B have the formula

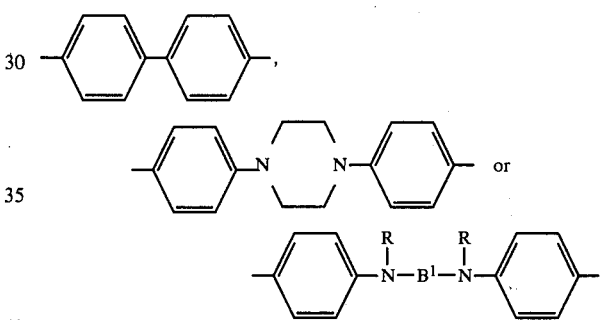

where $B^1$ is alkylene or aralkylene and R has the stated meaning.

Examples of preferred radicals $B^1$ are—$(CH_2)_{2-6}$ or

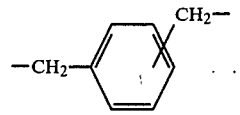

EXAMPLE 1

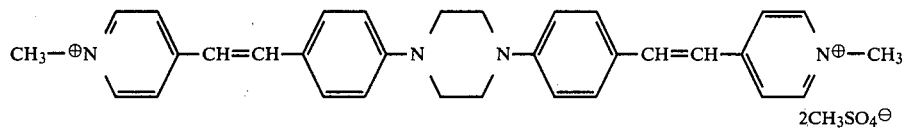

14.7 parts of diphenylpiperazinedialdehyde and 22 parts of 1,4-dimethylpyridinium methyl-sulfate in 100 parts of ethylene glycol monomethyl ether are refluxed for two hours in the presence of two parts of piperidine. After cooling, the product is filtered off and washed with methanol.

Yield: 12 parts

When used for wet-end coloring of paper, the dye gives an orange color. The tinctorial strength, the brilliance of the coloration, and the very slight color of the waste water when coloring bleached stock deserve particular mention.

Dyes with similar properties are obtained from the methylene-active components listed in the Table. The hue shown is that obtained with bleached stock.

| Structure | Anion | Color |
|---|---|---|
| ⊕ CH₃, CH₃—N, N—CH₃, O (pyrimidinone) | HSO₄⁻ | violet |
| benzothiazolium-CH₃, N-CH₃ | CH₃SO₄⁻ | red |
| H₃C, CH₃ indolenine-CH₃, N-CH₃ | CH₃SO₄⁻ | bluish red |
| H₃C, CH₃, Cl-indolenine-CH₃, N-CH₃ | CH₃SO₄⁻ | violet |
| CH₃-N, O, N-CH₃, CH₃ (quinoxalinone) | CH₃SO₄⁻ | blue |
| CH₃, CH₃ benzofuran | ZnCl₃⁻ | blue |

EXAMPLE 2

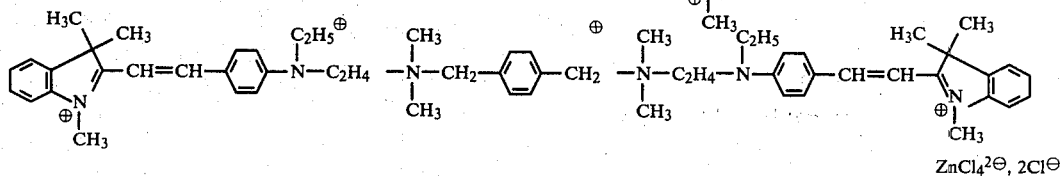

7.5 parts of the aldehyde of the formula

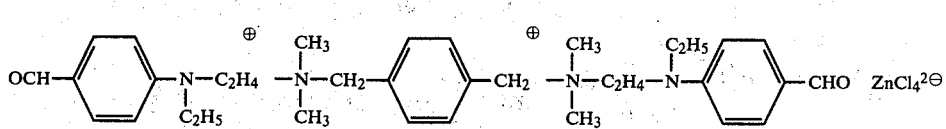

and 3.5 parts of 1,3,3-trimethyl-2-methyleneindolenine in 50 parts of 30 percent strength acetic acid are heated for one hour at 100° C. The mixture is diluted with water and the product is precipitated with sodium chloride solution.

Yield: 12 parts

The dye produces a red hue with ligneous stock and with bleached stock. The waste water is only slightly colored.

The above aldehyde is prepared as follows: 96 parts of N-ethyl-N-β-dimethylaminoethylaniline are dissolved in 150 parts of acetone and 44 parts of p-xylylene dichloride, dissolved in acetone, are added dropwise. After refluxing the mixture for eight hours, the product is filtered off cold, and is dried.

Yield: 123 parts; melting point 220°–222° C.

56 parts of the double aniline derivative thus obtained are dissolved in 100 parts of dimethylformamide. 31 parts of phosphorous oxychloride are then added dropwise in such a way that the temperature does not exceed 70° C. The reaction is completed by heating at 90° C. The mixture is worked up by pouring it into water and precipitating the cationic bis-aldehyde with sodium chloride/zinc chloride solution.

Yield: 46 parts; melting point 158°–160° C.

Good paper dyes are also obtained by using the following heterocyclic methylene bases:

| Structure | Anion | Color |
|---|---|---|
| ⊕ CH₃, CH₃—N, N—CH₃, O | HSO₄⁻ | red |
| benzothiazolium-CH₃, N-CH₃ | CH₃SO₄⁻ | orange red |
| CH₃—N⊕—CH₃ (pyridinium) | CH₃SO₄⁻ | orange |
| N⊕-CH₃, CH₃ (picolinium) | CH₃SO₄⁻ | yellow |
| quinolinium-CH₃, N-CH₃ | CH₃SO₄⁻ | red |
| CH₃, 4-methylquinolinium, N-CH₃ | CH₃SO₄⁻ | red |
| 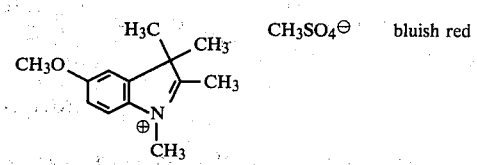 | CH₃SO₄⁻ | bluish red |

The quaternization of N-ethyl-N-β-dimethylaminoethylaniline was also carried out with the following bishalogen compounds:

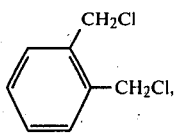

Cl—CH$_2$—CH=CH—CH$_2$—Cl, Br—CH$_2$CH$_2$—Br,
Br—CH$_2$CH$_2$CH$_2$—Br, Br—CH$_2$CH$_2$CH$_2$CH$_2$—Br,
Br—CH$_2$CH$_2$CH$_2$CH$_2$CH$_2$—Br and

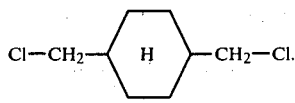

The dyes prepared from these intermediates have similar characteristics to those of the dyes described above. The same is true of the products which are obtained if the N-ethyl-N-β-dimethylaminoethylaniline is replaced by the following aniline derivatives:

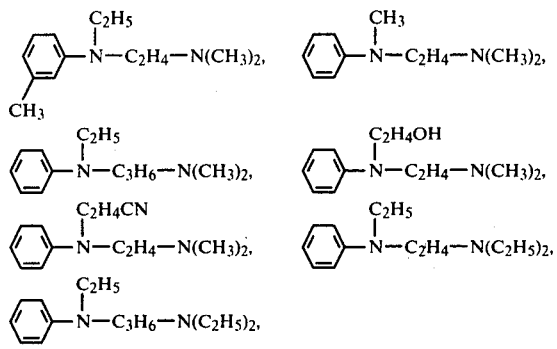

two hours at 80° C. in a mixture of 50 parts of ethanol and one ml of piperidine. The mixture is cooled and the product is filtered off.

Yield: 9 parts.

The product colors ligneous stock and bleached stock in luminous golden yellow hues. Only four or two percent, respectively, of the dye remain in the waste water. The dye is of very high tinctorial strength.

The components shown below were converted similarly to the corresponding dyes:

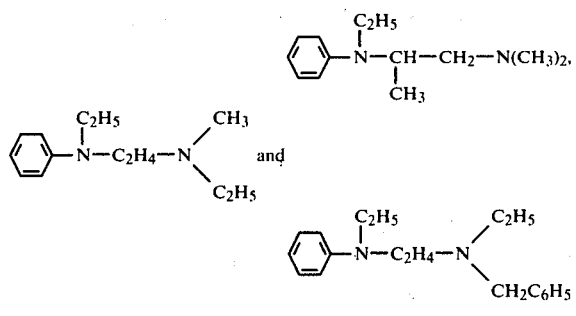

EXAMPLE 4

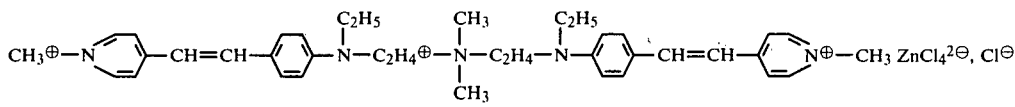

10.9 parts of 1,4-dimethylpyridinium methyl-sulfate and 11.2 parts of the aldehyde of the formula

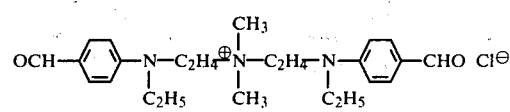

in 100 parts of alcohol are boiled for two hours in the presence of 0.5 part of piperidine. The mixture is diluted with water and the dye is precipitated by adding zinc chloride.

Yield: 19 parts.

The product colors ligneous paper reddish yellow, with little dye remaining in the waste water.

The following methylene-active heterocyclic compounds were also employed to synthesize the corresponding dyes, whose hues are shown below:

EXAMPLE 3

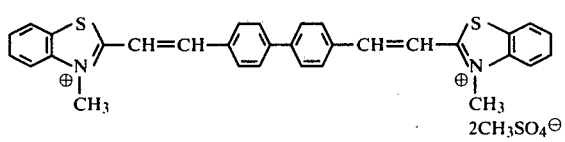

2CH$_3$SO$_4$$^\ominus$ 5.2 parts of 4,4'-diphenyldialdehyde and 13.8 parts of 2,3-dimethylbenzthiazolium methyl-sulfate are kept for

| Structure | Anion | Color |
|---|---|---|
| (3,3-dimethyl-1,2-dimethyl-3H-indolium) | CH₃SO₄⁻ | red |
| (1,3-dimethyl-2-cyanomethyl-benzimidazolium) | CH₃SO₄⁻ | yellow |
| (1,2,3-trimethyl-benzimidazolium) | Cl⁻ | yellow |
| (1,3,6-trimethyl-2-oxo-pyrimidinium) | HSO₄⁻ | red |

The following aldehydes were also employed, the results obtained being similar. The anion was Cl⁻ in each case.

OCH—⟨⟩—N(CH₃)—C₂H₄⊕—N(CH₃)₂—C₂H₄—N(C₂H₅)—⟨⟩—CHO, (with CH₃ on ring)

OCH—⟨⟩—N(CH₃)—C₂H₄⊕—N(CH₃)₂—C₂H₄—N(C₂H₅)—⟨⟩—CHO,

OCH—⟨⟩—N(CH₃)—C₂H₄⊕—N(C₂H₅)(CH₃)—C₂H₄—N(CH₃)—⟨⟩—CHO,

OCH—⟨⟩—N(CH₃)—C₂H₄⊕—N(C₂H₅)(CH₃)—C₂H₄—N(CH₃)—⟨⟩—CHO, (with CH₃ on ring)

OCH—⟨⟩—N(C₂H₅)—C₂H₄⊕—N(C₂H₅)(CH₃)—C₃H₆—N(C₂H₅)—⟨⟩—CHO,

OCH—⟨⟩—N(C₂H₅)—C₂H₄⊕—N(C₂H₅)(CH₃)—C₃H₆—N(CH₃)—⟨⟩—CHO,

OCH—⟨⟩—N(CH₂C₆H₅)—C₂H₄⊕—N(CH₃)(CH₃)—C₃H₆—N(CH₃)—⟨⟩—CHO, (Cl on ring)

OCH—⟨⟩—N(CH₃)—C₃H₆⊕—N(CH₃)(CH₃)—C₃H₆—N(CH₃)—⟨⟩—CHO,

—continued

OCH—⟨⟩—N(C₂H₅)—C₃H₆⊕—N(C₂H₅)(CH₃)—C₃H₆—N(CH₃)—⟨⟩—CHO,

OCH—⟨⟩—N(C₂H₄CN)—C₃H₆⊕—N(CH₃)(CH₃)—C₃H₆—N(C₂H₄CN)—⟨⟩—CHO and

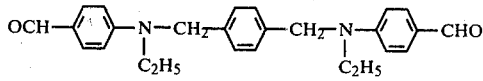

EXAMPLE 5

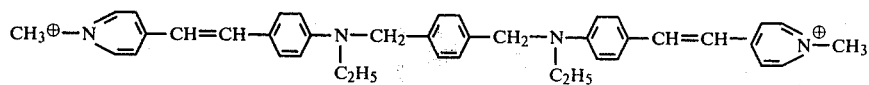

2 CH₃SO₄⁻

20 parts of the aldehyde of the formula

OCH—⟨⟩—N(C₂H₅)—CH₂—⟨⟩—CH₂—N(C₂H₅)—⟨⟩—CHO and 31 parts of 1,4-dimethylpyridinium methyl-sulfate in 50 parts of methylglycol are stirred for two hours at 120° C., piperidine being used as the catalyst. The mixture is then diluted with alcohol and the product is filtered off.

Yield: 28 parts.

The dye colors ligneous stock and lignin-free stock orange, with good exhaustion of the bath.

The dyes obtained from the following methylene-active components also give virtually colorless waste water:

| Structure | Anion | Color |
|---|---|---|
| (2,3-dimethyl-benzothiazolium) | CH₃SO₄⁻ | bluish red |
| (1,2-dimethyl-quinolinium) | CH₃SO₄⁻ | reddish violet |
| (1,3,6-trimethyl-2-oxo-pyrimidinium) | HSO₄⁻ | violet |
| (1,3-dimethyl-2-oxo-quinoxalinium) | CH₃SO₄⁻ | blue |
| (1-benzyl-3-methyl-2-oxo-quinoxalinium) | Cl⁻ | blue |

| | | |
|---|---|---|
| 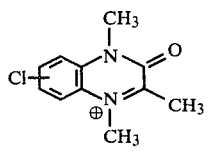 | CH$_3$SO$_4^\ominus$ | blue |
| 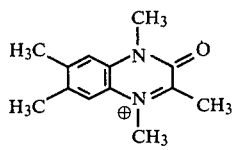 | CH$_3$SO$_4^\ominus$ | blue |
| 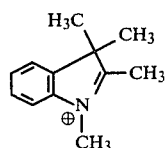 | CH$_3$SO$_4^\ominus$ | red |
| 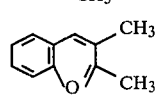 | ZnCl$_3^\ominus$ | blue |
| 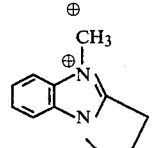 | CH$_3$SO$_4^\ominus$ | yellow |
| 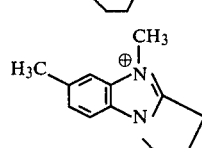 | CH$_3$SO$_4^\ominus$ | yellow |
| 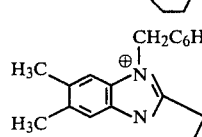 | Cl$^\ominus$ | yellow |
| 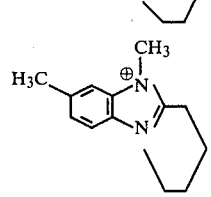 | CH$_3$SO$_4^\ominus$ | yellow |
| 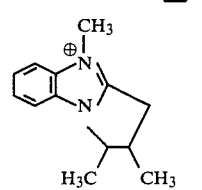 | CH$_3$SO$_4^\ominus$ | yellow |
| 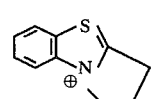 | Cl$^\ominus$ | red |
| 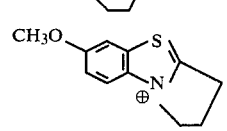 | Cl$^\ominus$ | red |
| 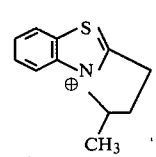 | Cl$^\ominus$ | red |
| 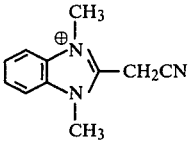 | Cl$^\ominus$ | yellow |
| 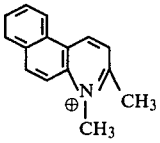 | CH$_3$SO$_4^\ominus$ | red |

Further paper dyes which give very brilliant hues and very little coloration of the waste water are obtained with the following aldehydes:

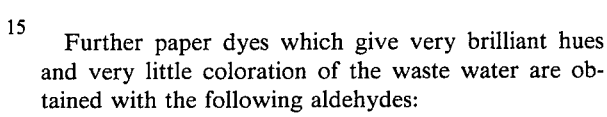

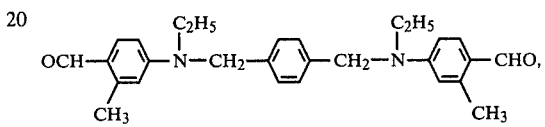

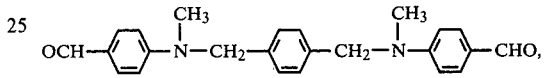

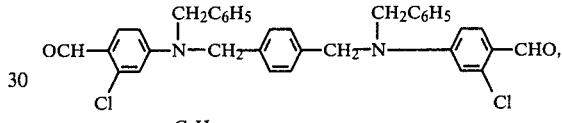

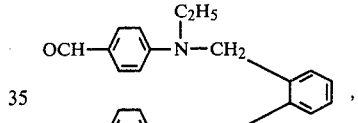

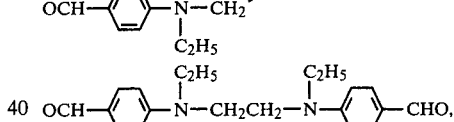

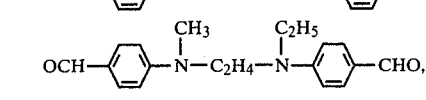

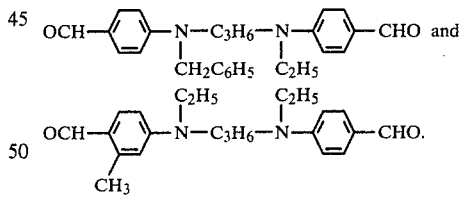

We claim:

1. Paper stock dyed with a compound of the formula $$A^1=CH-B-CH=A^2$$

wherein $A^1$ and $A^2$ are the same or different radicals derived from quaternized methylene active compounds $A^1H_2$ and $A^2H_2$ selected from the group consisting of:

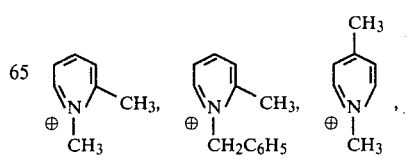

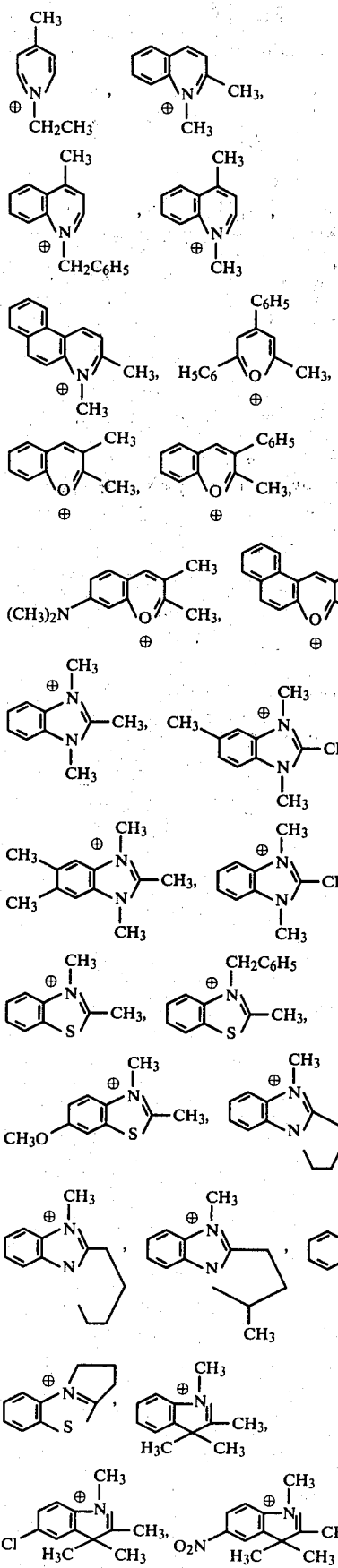
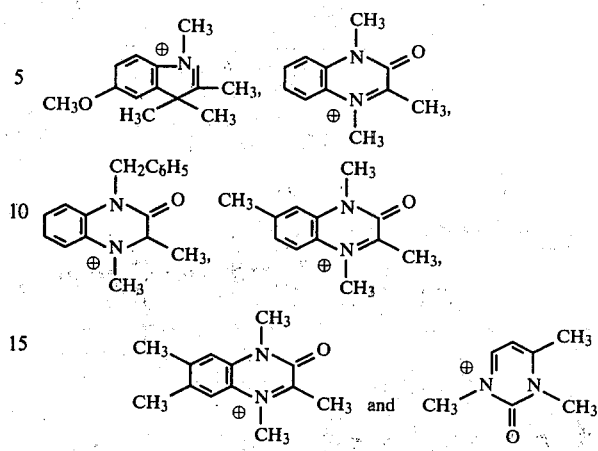
and wherein B is a bridge member selected from the group consisting of
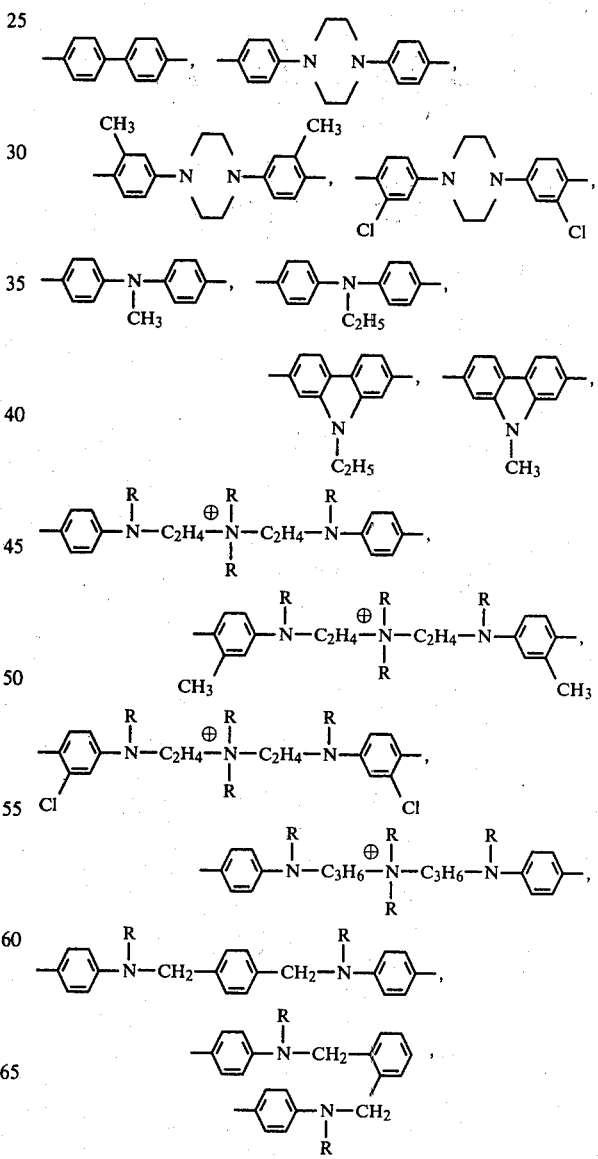

-continued

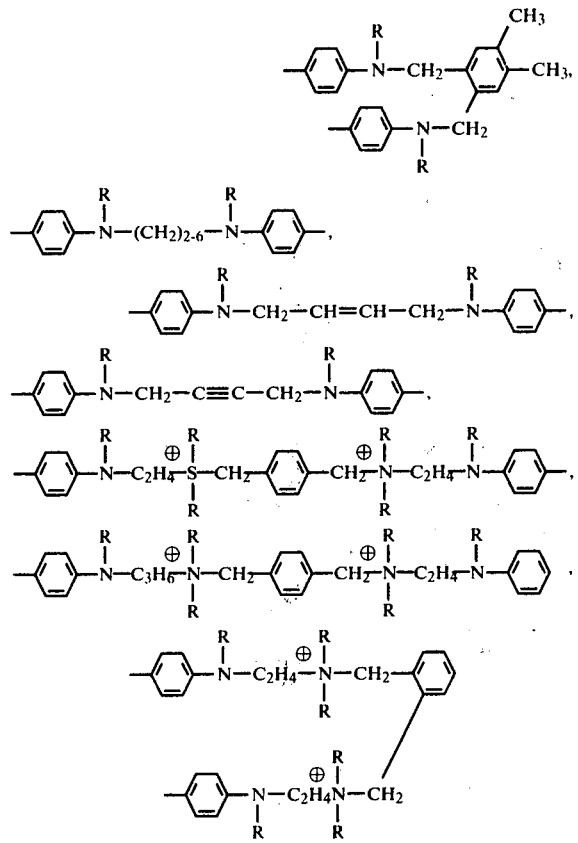

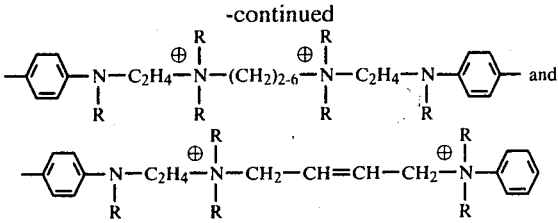

where R is $C_1$–$C_4$-alkyl, $\beta$-hydroxyethyl, $\beta$-cyanoethyl or benzyl.

2. The paper stock of claim 1 wherein $A^1$ and/or $A^2$ is derived from the quinolinium, $\gamma$-quinolinium, indolinium, benzthiazolium or quinoxalonium series and the radical B has the formula:

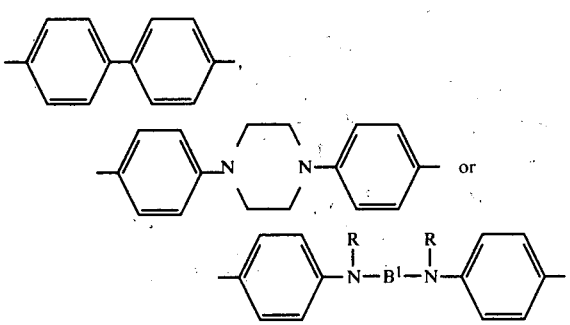

wherein $B^1$ is alkylene or aralkylene and R is $C_1$–$C_4$-alkyl, $\beta$-hydroxyethyl, $\beta$-cyanoethyl or benzyl.

* * * * *